April 16, 1968 M. K. STARK 3,378,828

SHORT RANGE RADIO TELEMETRY

Filed June 16, 1965

INVENTOR.
Marvin K. Stark
BY
Hugh L. Fisher
ATTORNEY 3,378,828

SHORT RANGE RADIO TELEMETRY

Marvin K. Stark, Milford, Mich., assignor to General Motors Corporation, Detroit, Mich., a corporation of Delaware Filed June 16, 1965, Ser. No. 464,498
3 Claims. (Cl. 340—206)

ABSTRACT OF THE DISCLOSURE

A telemetry system including a tone transmitter and a demodulator receiver. The transmitter, which may be miniaturized, includes a tunnel-diode multivibrator to produce a width modulated control signal for application to a voltage controlled oscillator which generates the tone.

*Summary of the invention*

Figure 1:
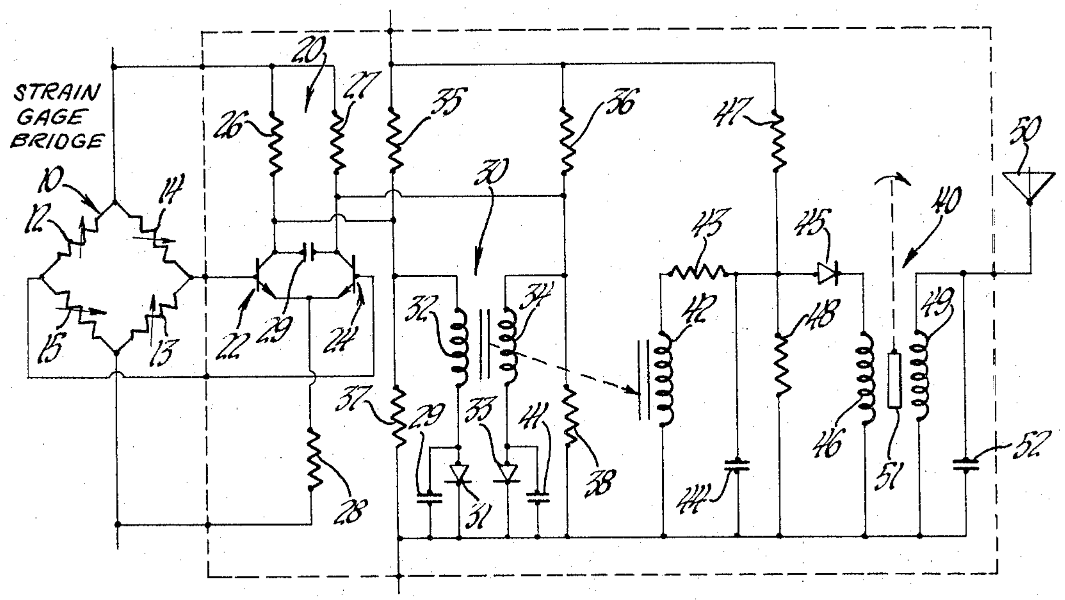

This invention relates to radio telemetry systems and more particularly to a radio telemetry system including a transmitter having a stable signal transfer means.

A radio telemetry system may be particularly useful to monitor some quantity such as stress at a remotely located point of observation where it is not practicable to run wires between the point of observation and a readout or recording device. For example, it is extremely difficult to string wires for telemetry purposes between an innermost part of an internal combustion engine or some other mechanical assembly and an outside readout or recording device. For this reason it is particularly desirable to employ a radio telemetry system including a small transmitter means for generating a signal, a particular characteristic of which, such as frequency, may be modulated in accordance with the quantity to be monitored. This transmitter means may be suitably mounted at the point of observation upon assembly of the mechanical assembly. The systems may also include a receiver which is located so as to receive the modulated signal and is effective to demodulate the received signal thereby to provide an output representing the variations in the observed quantity.

The present invention provides a radio telemetry system wherein the transmitter includes stable signal transfer means for producing a modulation control signal which varies according to the quantity under observation. In general, this includes means for producing a voltage waveform of substantially constant frequency but having a duty cycle which varies in accordance with an input signal which may be received from a suitable transducer effective to provide an output which varies according to a quantity being monitored. The variable duty cycle signal which is generated by the combination described above may, for example, be applied to a voltage controlled oscillator to vary the frequency of the output of the oscillator thereby to provide a frequency modulated signal which represents the variations in the quantity under observation. This frequency modulated signal may be applied to a suitable antenna for short range broadcasts to a nearby receiver device.

In a particular embodiment the means for producing the variable duty cycle waveform may comprise a multivibrator having two sides each of which includes the combination of a negative resistance device such as a tunnel diode and an inductor. The inductors of the two sides may be disposed on a common magnetic core for cross-coupling purposes. In such a multivibrator the temperature stability is greatly enhanced due to the fact that the two inductors being wound on a common core are subject to exactly the same variations in character with temperature. The symmetry or ratio of signal duration which may be picked up from either side of the multivibrator may be varied by means of a differential amplifier having outputs connected across the sides of the multivibrator and having inputs connected to the transducer means such that the duty cycles of the respective sides of the multivibrator may be varied in accordance with the signal produced by the transducer means.

Figure 2:
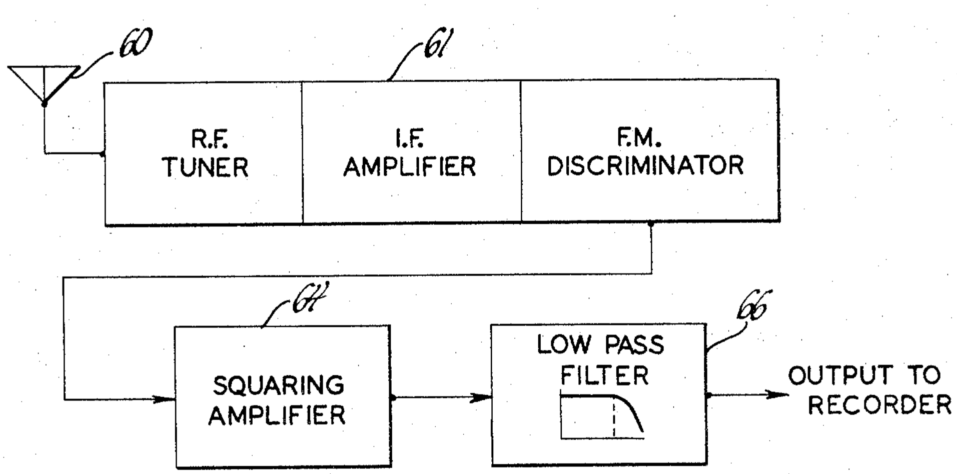

The invention may be best understood by reference to a detailed description of a specific embodiment. Such a description is given in the following specification and is to be taken with the accompanying figures of which:

FIGURE 1 is a schematic diagram of a particular embodiment of the transmitter which is utilized in carrying out the invention; and FIGURE 2 is a block diagram of a receiver which may be used in carrying out the invention.

Referring now to FIGURE 1, the transmitter portion of the telemetry system is shown to include a transducer in the form of a strain gage bridge 10 which may be properly mounted on a part, the strain in which is to be observed. The strain gage bridge 10 is connected to a differential amplifier 20 which produces a voltage which is to be differentially applied across the sides of a tunnel diode multivibrator 30. The voltage from the differential amplifier 20 is effectvie to vary the symmetry or ratio between the duty cycles of the sides of the multivibrator 30 in accordance with the signal which is received from the strain gage bridge 10. The variable duty cycle signal from the multivibrator 30 may be applied to a controllable oscillator 40 for the purpose of controlling the frequency of the output of the oscillator. This frequency modulated signal may be applied to an antenna 50 for short range radio broadcast to a receiver such as shown in FIGURE 2.

Describing the schematic circuit of FIGURE 1 in somewhat greater detail, the strain gage bridge is shown to comprise four legs 12, 13, 14 and 15 connected into a bridge circuit. One side of a low voltage source is connected to the common connection between legs 12 and 14 as shown, and the other side of the voltage source is connected to the common point between legs 13 and 15 as shown. Thus energized, the bridge provides an output across the horizontal terminals as shown in FIGURE 1. This output signal is applied to the differential amplifier 20. The differential amplifier 20 comprises a pair of NPN transistors 22 and 24 which have their input or base electrodes connected to the aforementioned horizontal output terminals of the strain gage bridge 10. The collector electrodes of transistors 22 and 24 are connected through a pair of resistors 26 and 27, respectively, to the positive terminal of the voltage source which also energizes the strain gage bridge 10. The emitter electrodes of transistors 22 and 24 are commonly connected through a resistor 28 to the negative terminal of the source. In addition, the collectors of transistors 22 and 24 are connected across a capacitor 29 which forms a low pass filter with the collector load resistors 26 and 27 to reduce input signals variations which may occur at a rate near the subcarrier frequency; that is, the free running frequency of the multivibrator 30.

The differential output of the amplifier 20 is connected across the sides of a tunnel diode multivibrator 30. One side of the multivibrator 30 comprises a silicon tunnel diode 31 connected in series with an inductor 32. The other side of the multivibrator similarly comprises a silicon tunnel diode 33 connected in series with an inductor 34. The inductors 32 and 34 form coupled windings of a pulse transformer which constitutes the subcarrier frequency generator of the telemetry transmitter. As such, the inductive windings 32 and 34 are commonly wound on a single core preferably in bifilar fashion. So wound, the inductors are cross-coupled and subject to precisely similar temperature variations and thus contribute markedly to the temperature stability of the transmitter shown in FIG. 1.

As shown in FIGURE 1, the left side of the multivibrator 30 is connected to the collector circuit of transistor 22 and also through a resistor 35 to the positive terminal of a DC voltage source. Similarly, the other side of the multivibrator is connected to the collector circuit of transistor 24 and also through a resistor 36 to the positive terminal of the voltage source. The negative terminal of the voltage source is shown connected to the lower terminals of the multivibrator sides represented by the cathodes of tunnel diodes 31 and 33. Resistors 37 and 38 are connected across the left and right sides respectively of the multivibrator 30 as shown in FIGURE 1. In addition, the performance of the multivibrator may be enhanced by the connection of capacitors 39 and 41 in shunt with tunnel diodes 31 and 33, respectively. The multivibrator 30 functions in the manner of a relaxation oscillator to produce a substantially square wave bipolar output from each side, the duty cycle of which may be varied by application of the differential output of the amplifier 20 across the two sides of the multivibrator 30. Upon application of this differential voltage, the normal symmetry of the multivibrator is altered to increase the duty cycle of one polarity of the output and reduce the duty cycle of the opposite polarity.

This variable width signal is picked up by an inductor winding 42 which is inductively coupled with inductor windings 32 and 34. This signal is applied across a series resistor 43 and a shunt capacitor 44 to the voltage controlled oscillator 40. The oscillator 40 comprises a single tunnel diode 45 and an inductor 46. The combination of diode 45 and inductor 46 forms a negative resistance oscillator, the proper bias for which is provided by the combination of resistors 47 and 48 which are connected to the DC voltage source shared by the multivibrator 30 as shown. Capacitor 44 may function as an RF bypass capacitor. The frequency of oscillation of the oscillator circuit 40 is determined in part by the negative resistance of the tunnel diode 45 and by the effective capacitance of the diode. Both of these factors change with the bias applied to the diode from the multivibrator circuit 30. Accordingly, the subcarrier or duration modulated signal from the multivibrator 30 is applied by way of inductor winding 42 to the oscillator circuit 40 thereby to frequency modulate the output of the oscillator 40.

The output coupling link comprises winding 49 and shunt tuning capacitor 52 which are connected to the antenna 50. Both the winding 46 and winding 49 may be wound on a slug tuned core 51 which may be externally adjustable for center frequency adjustment. The antenna 50 may comprise a short wire conveniently located on the part under observation.

Referring now to FIGURE 2, the FM receiver for the transmitter of FIGURE 1 is shown in block diagram form. The receiver is employed to amplify and demodulate the signal which is received from the transmitter. The receiver comprises an antenna 60 connected into a commercial FM tuner 61 which produces an output which is a reproduction of the duration modulated subcarrier signal generated by the multivibrator 30 in the transmitter. However, the band width limitation of the receiver reduces the rise and fall times of that signal so that it is necessary to square the signal before further detection. This is done in a squaring amplifier 64. Since the subcarrier modulation used varies the duty cycle of the subcarrier, demodulation is obtained by clamping the output from the squaring amplifier 64 to a constant voltage amplitude and passing it through a low pass filter 66. The filter cutoff frequency is selected to be well below the subcarrier rate so that the output contains only the duty cycle variations in the signal which is received from the transmitter.

While the present invention has been described with reference to a specific embodiment thereof, it is to be understood that various modifications and additions to this invention may be apparent to those skilled in the art. Therefore, for a definition of the invention reference should be had to the appended claims.

What is claimed is:

1. A telemetry transmitter comprising transducer means for producing a first voltage which varies in magnitude in accordance with changes in a quantity to be monitored, a multivibrator having two stages which are alternately operative at a predetermined frequency, differential amplifier means having two conductive elements, means connected between the transducer means and the differential amplifier for varying the conductivity of the two elements in accordance with variation in the first voltage, means connecting the two elements to respective stages of the multivibrator for varying the duty cycle of the output of the multivibrator in accordance with variations in the first voltage, oscillator means for producing a carrier signal of predetermined frequency for transmission, and means for applying an output of the multivibrator means to the oscillator means thereby to modulate the frequency of the carrier signal according to variations in the duty cycle of the multivibrator means.

2. A telemetry transmitter comprising transducer means for producing a first voltage which varies in magnitude in accordance with changes in a quantity to be monitored, a multivibrator having first and second stages each comprising a negative resistance element and an inductor, the inductors of the first and second sides being disposed on a common magnetic core to provide cross coupling, means for differentially applying the first voltage across the stages of the multivibrator to vary the duty cycle of the output thereof in accordance with variations in the first voltage, oscillator means for producing a carrier signal of predetermined frequency for transmission, and means for applying an output of the multivibrator to the oscillator means thereby to modulate the frequency of the carrier signal according to variations in the duty cycle of the multivibrator.

3. In a telemetry transmitter, control means comprising a multivibrator having first and second stages each including a tunnel diode and a series connected inductor, the inductors being disposed on a common magnetic core to provide cross coupling, a differential amplifier having input and output terminals, the output terminals being connected to respective stages of the multivibrator to vary the duty cycle of each stage of the multivibrator in accordance with signals applied to said input terminals, a voltage controlled oscillator having an input for receiving a control voltage and an output for producing a tone in response to the control voltage, and means inductively coupling the multivibrator inductors to the oscillator input to produce the control voltage when the multivibrator operates asymmetrically.

References Cited

UNITED STATES PATENTS 2,468,703 4/1949 Hammel ---------- 340—206

THOMAS B. HABECKER, *Primary Examiner.*